(12) United States Patent
Cabillic et al.

(10) Patent No.: US 8,046,748 B2
(45) Date of Patent: Oct. 25, 2011

(54) METHOD AND SYSTEM TO EMULATE AN M-BIT INSTRUCTION SET

(75) Inventors: Gilbert Cabillic, Brece (FR);
Jean-Philippe Lesot, Etrelles (FR);
Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 1386 days.

(21) Appl. No.: 11/188,310

(22) Filed: Jul. 25, 2005

(65) Prior Publication Data
US 2006/0025986 A1 Feb. 2, 2006

(30) Foreign Application Priority Data

Jul. 27, 2004 (EP) .................................... 04291918

(51) Int. Cl.
*G06F 9/45* (2006.01)
*G06F 9/44* (2006.01)
(52) U.S. Cl. ...................... 717/138; 717/131; 717/135
(58) Field of Classification Search ................. 717/127, 717/134–143, 131
See application file for complete search history.

(56) References Cited

U.S. PATENT DOCUMENTS

| | | | | |
|---|---|---|---|---|
| 5,507,030 A * | 4/1996 | Sites | ................ | 717/136 |
| 5,551,015 A * | 8/1996 | Goettelmann et al. | ........ | 717/137 |
| 5,560,013 A * | 9/1996 | Scalzi et al. | .................. | 717/138 |
| 5,781,750 A | 7/1998 | Blomgren et al. | | |
| 5,892,966 A | 4/1999 | Petrick et al. | | |
| 5,909,578 A * | 6/1999 | Buzbee | ......................... | 717/130 |
| 5,937,193 A * | 8/1999 | Evoy | .............................. | 717/140 |
| 6,026,485 A * | 2/2000 | O'Connor et al. | ........... | 712/226 |
| 6,075,942 A * | 6/2000 | Cartwright, Jr. | .............. | 717/138 |
| 6,205,540 B1 | 3/2001 | Grieb et al. | | |
| 6,480,952 B2 | 11/2002 | Gorishek et al. | | |
| 6,941,545 B1 * | 9/2005 | Reese et al. | ................... | 717/130 |
| 6,954,923 B1 * | 10/2005 | Yates et al. | ..................... | 717/130 |
| 7,020,766 B1 * | 3/2006 | Wang et al. | .................... | 712/227 |
| 7,047,394 B1 * | 5/2006 | Van Dyke et al. | ............ | 712/209 |
| 7,069,545 B2 * | 6/2006 | Wang et al. | .................... | 717/131 |
| 7,093,239 B1 * | 8/2006 | van der Made | ............... | 717/135 |
| 7,194,732 B2 * | 3/2007 | Fisher et al. | .................. | 717/131 |
| 7,254,806 B1 * | 8/2007 | Yates et al. | .................... | 717/136 |
| 7,739,673 B2 * | 6/2010 | Linden | ........................ | 717/140 |
| 7,899,661 B2 * | 3/2011 | Rompaey et al. | .............. | 703/22 |
| 2004/0024999 A1 | 2/2004 | Chauvel et al. | | |

OTHER PUBLICATIONS

Carro et al, "System synthesis for multiprocessor embedded applications", ACM Date pp. 697-702, 2000.*
Zhao et al, "SPACE: Sharing pattern based directory coherence for multicore scalability", ACM PACT, pp. 135-146, 2010.*

(Continued)

*Primary Examiner* — Anil Khatri
(74) *Attorney, Agent, or Firm* — Ronald O. Neerings; Wade James Brady, III; Frederick J. Telecky, Jr.

(57) ABSTRACT

A method and system to emulate an M-bit instruction set. At least some of the illustrative embodiments are a method comprising fetching at least a portion of an instruction (the instruction from a first instruction set that is not directly executable by a processor), indexing into a table to an index location (the index location based on the at least a portion of the instruction), executing a first series of instructions directly executable by the processor (the first series of instructions pointed to by the table at the index location), and thereby emulating execution of the instruction from the first instruction set.

18 Claims, 4 Drawing Sheets

OTHER PUBLICATIONS

Chhabra et al, "Making secure processors OS and performance friendly", ACM Trans. on Arch. & Code Optimization, vol. 5, No. 4, article 16, pp. 1-35, 2009.*

Yoaz et al, "Speculation techniques for improving load related instruction scheduling", IEEE, pp. 42-53, 1999.*

* cited by examiner

| R0 | GENERAL PURPOSE (GP) | |
|---|---|---|
| R1 | GENERAL PURPOSE (GP) | |
| R2 | GENERAL PURPOSE (GP) | |
| R3 | GENERAL PURPOSE (GP) | |
| R4 | PROGRAM COUNTER (PC) | |
| R5 | GENERAL PURPOSE/LOCAL VARIABLE POINTER (LV) | |
| R6 | STACK POINTER (SP) | |
| R7 | TOP OF STACK (ToS) | |
| R8 | GENERAL PURPOSE/ADDRESS INDEX 0 (AI0) | |
| R9 | GENERAL PURPOSE/ADDRESS INDEX 1 (AI1) | |
| R10 | GENERAL PURPOSE (GP) | |
| R11 | GENERAL PURPOSE (GP) | |
| R12 | MICRO-PROGRAM COUNTER (micro-PC) | |
| R13 | GENERAL PURPOSE (GP) | |
| R14 | GENERAL PURPOSE/INDIRECT REGISTER INDEX (IRI) | |
| R15 | STATUS AND CONTROL (ST) | WIDE ENABLE FLAG |

*FIG. 3*

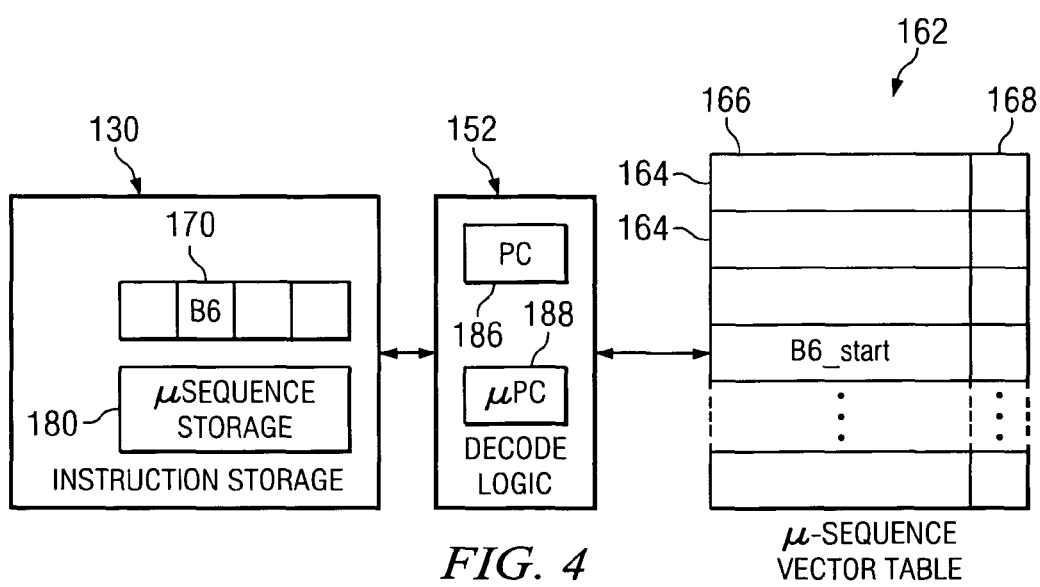

*FIG. 4*

METHOD AND SYSTEM TO EMULATE AN M-BIT INSTRUCTION SET

CROSS-REFERENCE TO RELATED APPLICATIONS

This application claims the benefit of European Patent Application No. 04291918.3, filed Jul. 27, 2004, incorporated by reference herein as if reproduced in full below. This application is related to co-pending and commonly assigned application Ser. No. 11/188,336 entitled "Method And System To Disable The 'WIDE' Prefix."

BACKGROUND OF THE INVENTION

1. Technical Field of the Invention

The present invention relates to processors and more particularly to processors that execute Java™ bytecodes.

2. Background Information

Java™ is a programming language that, at the source code level, is similar to object oriented programming languages such as C++. Java™ language source code is compiled into an intermediate representation based on a plurality "bytecodes" that define specific tasks. In some implementations, the bytecodes are further compiled to machine language for a particular processor. In order to speed the execution of Java™ language programs, some processors are specifically designed to execute some of the Java™ bytecodes directly.

Many times, a processor that directly executes Java™ bytecodes is paired with a general purpose processor so as to accelerate Java™ program execution in a general or special purpose machine. It would be advantageous to provide accelerations, similar to those seen for directly executed Java™ bytecodes, in other languages and development environments.

SUMMARY

The problems noted above are solved in large part by a method and system to emulate an M-bit instruction set. At least some of the illustrative embodiments are a method comprising fetching at least a portion of an instruction (the instruction from a first instruction set that is not directly executable by a processor), indexing into a table to an index location (the index location based on the at least a portion of the instruction), executing a first series of instructions directly executable by the processor (the first series of instructions pointed to by the table at the index location), and thereby emulating execution of the instruction from the first instruction set.

Notation and Nomenclature

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

The terms "asserted" and "not asserted" are used herein to refer to Boolean conditions. An asserted state need not necessarily be a logical 1 or a high voltage state, and thus could equally apply to an asserted being a logical 0 or a low voltage state. Thus, in some embodiments an asserted state may be a logical 1 and a not-asserted state may be a logical 0, with de-assertion changing the state from a logical 1 to a logical 0. Equivalently, an asserted state may be a logic 0 and a not-asserted state may a logical 1 with a de-assertion being a change from a logical 0 to a logical 1.

BRIEF DESCRIPTION OF THE DRAWINGS

For a more detailed description of the preferred embodiments of the present invention, reference will now be made to the accompanying drawings, wherein:

FIG. 3 shows various registers used in the JSM of FIGS. 1 and 2;

FIG. 4 illustrates operation of the JSM to trigger "microsequences";

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, unless otherwise specified. In addition, one skilled in the art will understand that the following description has broad application, and the discussion of any embodiments is meant only to be illustrative of those embodiments, and not intended to intimate that the scope of the disclosure, is limited to those embodiments.

Figure 1:
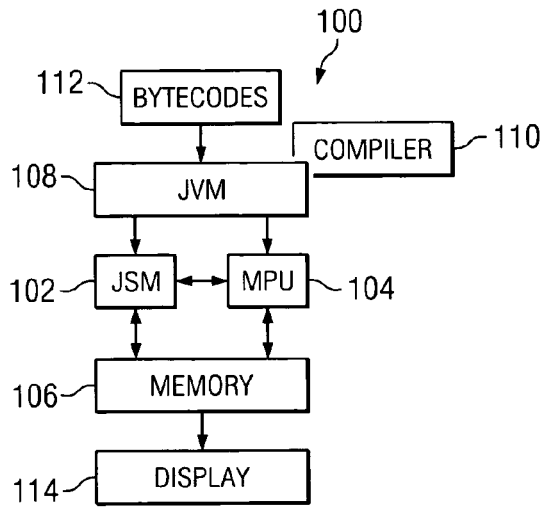
FIG. 1 shows a diagram of a system in accordance with embodiments of the invention.

FIG. 1 shows a system 100 in accordance with embodiments of the invention. As shown, the system may comprise at least two processors 102 and 104. Processor 102 may be referred to for purposes of this disclosure as a Java Stack Machine ("JSM") and processor 104 may be referred to as a Main Processor Unit ("MPU"). System 100 may also comprise memory 106 coupled to both the JSM 102 and MPU 104. At least a portion of the memory 106 may be shared by both processors, and if desired, other portions of the memory 106 may be designated as private to one processor or the other. System 100 also comprises a Java Virtual Machine ("JVM") 108, compiler 110, and a display 114. The JVM 108 may comprise a combination of software and hardware. The software may comprise the compiler 110 and the hardware may comprise the JSM 102. The JVM may comprise a class loader, bytecode verifier, garbage collector, and a bytecode interpreter loop to interpret the bytecodes that are not executed on the JSM processor 102. Other components (not specifically shown) may be included as desired for various applications.

Java™ language source code is converted or compiled to a series of bytecodes 112, with each individual one of the bytecodes referred to as an "opcode." Bytecodes 112 may be provided to the JVM 108, possibly compiled by compiler 110, and provided to the JSM 102 and/or MPU 104 for execution. In accordance with some embodiments of the invention, the JSM 102 may execute at least some Java™ bytecodes directly. When appropriate, however, the JVM 108 may also request the MPU 104 to execute one or more Java™ bytecodes not executed or executable by the JSM 102. In addition to executing compiled Java™ bytecodes, the MPU 104 also may execute non-Java instructions. The MPU 104 may thus also host an operating system ("O/S") (not specifically shown) which performs various functions such as system memory management, system task management that schedules the software aspects of the JVM 108 and most or all other native tasks running on the system, management of the display 114, and receiving input from input devices (not specifically shown). Java™ code, whether executed on the JSM 102 or MPU 104, may be used to perform any one of a variety of applications such as multimedia, games or web based applications in the system 100, while non-Java™ code, which may comprise the O/S and other native applications, may still run on the system on the MPU 104.

Most Java™ bytecodes perform stack-based operations. For example, an "IADD" (integer add) Java TM opcode pops two integers off the top of the stack, adds them together, and pushes the sum back on the stack. A "simple" opcode is one in which the JSM 102 may perform an immediate operation either in a single cycle (e.g., an IADD opcode) or in several cycles (e.g., "DUP2_X2"). A "complex" opcode is one in which several memory accesses may be required to be made within the JVM data structure for various verifications (e.g., NULL pointer, array boundaries).

A JSM processor 102 in accordance with embodiments of the invention may execute, in addition to the Java™ bytecodes, a second instruction set other than Java™ bytecodes. In some embodiments, the second instruction set may comprise register-based and memory-based operations rather than stack-based operations. This second instruction set complements the Java™ instruction set and, accordingly, may be referred to as a complementary instruction set architecture ("C-ISA"). By complementary, it is meant that some complex Java™ bytecodes may be replaced by a "micro-sequence" comprising C-ISA instructions. The execution of Java™ code may thus be made more efficient and run faster by replacing some opcodes by more efficient micro-sequences of C-ISA instructions, and as discussed more fully below, other instruction sets may be emulated using the mirco-sequences. The JSM 102 thus comprises a stack-based architecture for direct execution of Java™ bytecodes, combined with a register-based architecture for direct execution of memory based micro-sequences of C-ISA instructions. Because various data structures described herein are JVM-dependent, and thus may change from one JVM implementation to another, the software flexibility of the micro-sequence provides a mechanism for various JVM optimizations now known or later developed.

Figure 2:
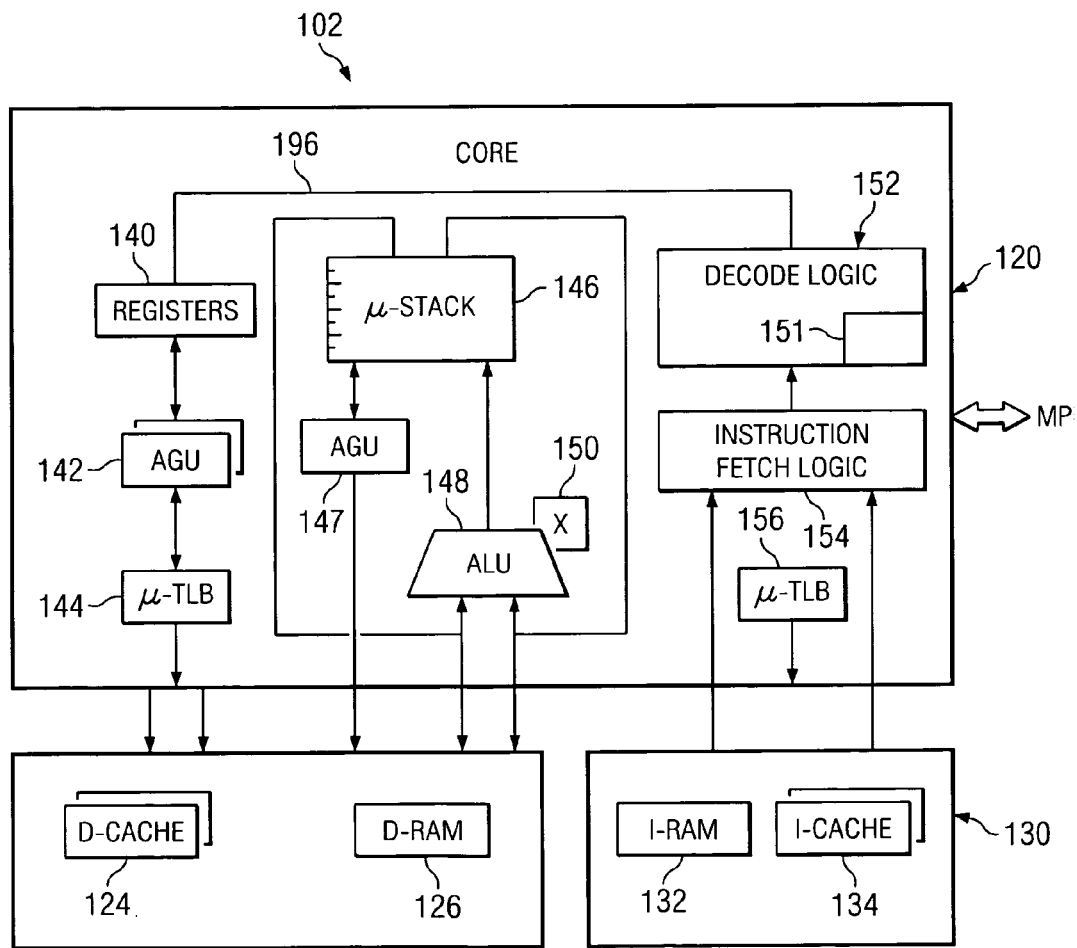
FIG. 2 shows a block diagram of the JSM of FIG. 1 in accordance with embodiments of the invention.

FIG. 2 shows an illustrative block diagram of the JSM 102. As shown, the JSM comprises a core 120 coupled to data storage 122 and instruction storage 130. The components of the core 120 preferably comprise a plurality of registers 140, address generation units ("AGUs") 142 and 147, micro-translation lookaside buffers (micro-TLBs) 144 and 156, a multi-entry micro-stack 146, an arithmetic logic unit ("ALU") 148, a multiplier 150, decode logic 152, and instruction fetch logic 154. Data pointed to by operands of opcodes may be retrieved from data storage 122 or from the micro-stack 146, and processed by the ALU 148. Instructions may be fetched from instruction storage 130 by fetch logic 154 and decoded by decode logic 152. The AGUs 142 may be used to calculate addresses based, at least in part, on data contained in the registers 140. AGU 147 couples to the micro-stack 146 and may manage overflow and underflow conditions in the micro-stack 146. The micro-TLBs 144 and 156 perform the function of a cache for the address translation and memory protection information bits that are under the control of the operating system running on the MPU 104.

Java™ bytecodes may pop data from and push data onto the micro-stack 146, which micro-stack 146 preferably comprises a plurality of gates in the core 120 of the JSM 102. The micro-stack 146 preferably comprises the top x entries of a larger stack that is implemented in data storage 122. Although the value of x may be vary in different embodiments, in accordance with at least some embodiments the size x of the micro-stack may be the top eight entries in the larger, memory-based stack. By implementing the micro-stack 146 hardware in the core 120 of the processor 102, access to the data contained in the micro-stack 146 is very fast, although any particular access speed is not a limitation on this disclosure.

ALU 148 adds, subtracts, and shifts data. The multiplier 150 may be used to multiply two values together in one or more cycles. The instruction fetch logic 154 fetches instructions from instruction storage 130, which instructions may be decoded by decode logic 152. Because the JSM 102 is configured to process instructions from at least two instruction sets, the decode logic 152 comprises at least two modes of operation, one mode for each instruction set. As such, the decode logic unit 152 may comprise a Java TM mode in which Java™ bytecodes may be decoded, and a C-ISA mode in which micro-sequences of C-ISA instructions may be decoded.

The data storage 122 comprises data cache ("D-cache") 124 and data random access memory ("D-RAM") 126. The stack (excluding the micro-stack 146), arrays and non-critical data may be stored in the D-cache 124, while local variables and data may be stored in D-RAM 126. The instruction storage 130 may comprise instruction RAM ("I-RAM") 132 and instruction cache ("I-CACHE") 134. The I-RAM 132 may be used for opcodes or micro-sequences, and the I-CACHE 134 may be used to store other types of Java™ bytecode and mixed Java™/C-ISA instructions.

Referring now to FIG. 3, the registers 140 may comprise a plurality of registers designated as R0-R15. Registers R0-R3, R5, R8-R11 and R13-R14 may be used as general purposes ("GP") registers for any purpose. Other registers, and some of the GP registers, may be used for specific purposes. For example, registers R4 and R12 may each be used to store program counters, with R4 storing a program counter ("PC") for a stream of bytecodes, and R12 storing a micro-program counter ("micro-PC") for executing micro-sequences. The use of the PC and micro-PC will be explained in greater detail below. In addition to use as a GP register, register R5 may be used to store the base address of a portion of memory in which Java TM local variables may be stored when used by a Java™ method. The top of the micro-stack 146 can be referenced by the values in registers R6 and R7, and the top of the micro-stack may have a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"). Register R14 may also be used to hold the indirect register index ("IRI"). Register R15 may be used for status and control of the JSM 102. At least one bit (called the "Micro-Sequence-Active" bit, not specifically shown) in status register R15 is used to indicate whether the JSM 102 is executing by way of a micro-sequence. This bit controls, in particular, which program counter is used (R4 (PC) or R12 (micro-PC)) to fetch the next instruction. Another bit of the status and control register R15 (the bit termed herein the "WIDE ENABLE flag" or "WIDE ENABLE bit", and given the reference number 198) is used indicate whether the Java™ WIDE opcode is treated as a non-executed prefix, or whether the WIDE value 0xC4 (hexadecimal value C4) may be assigned other functions directly executable by the processor or executable by way of a micro-sequence. In alternative embodiments, the WIDE ENABLE flag may in other portions of the JSM processor 102, such as register R151 in the decode logic 152 (FIG. 2).

Referring again to FIG. 2, the WIDE ENABLE flag 198 of illustrative register R15 (not specifically shown in FIG. 2) preferably couples to the decode logic 152 by way of line 196. When the WIDE ENABLE flag 198 is asserted, the decode logic 152, and indeed the processor 102, treat WIDE as a prefix that modifies the operand width of an opcode that immediately follows the WIDE opcode. However, when the WIDE ENABLE flag 198 is not asserted, then the 0xC4 value is treated like other opcodes that may be directly executable by the processor 102. Thus, when the WIDE ENABLE flag 198 is not asserted the 0xC4 value can perform any desired functionality, and that functionality need not necessarily be related to operand width. Moreover, the 0xC4 value may then also be utilized as a trigger for execution of a micro-sequence.

FIG. 4 illustrates the operation of the JSM 102 with regard to triggering of micro-sequences based on Java™ bytecodes, including the 0xC4 opcode when the WIDE ENABLE flag 198 is not asserted. In particular, FIG. 4 illustrates the instruction storage 130, the decode logic 152, and a micro-sequence vector table 162. The decode logic 152 accesses the instruction storage 130 and a micro-sequence vector table 162. The decode logic 152 retrieves instructions (e.g., instruction 170) from instruction storage 130 by way of instruction fetch logic 154 (FIG. 2) and decodes the instructions to determine the type of instruction. If the instruction 170 is a WIDE opcode, and the WIDE ENABLE flag 198 is asserted, the decode logic instructs the processor with regard to fetch width regarding the next opcode, and the process starts anew. If, however, the WIDE ENABLE flag 198 is not asserted and the 0xC4 opcode is the fetched opcode, the JSM 102 either directly executes the opcode to perform any desirable function, or triggers a micro-sequence to perform any desirable function.

The micro-sequence vector table 162 may be implemented in the decode logic 152, or as separate logic in the JSM 102. The micro-sequence vector table 162 preferably comprises a plurality of entries 164, such as one entry for each opcode that the JSM may receive. For example, if there are a total of 256 bytecodes, the micro-sequence vector table 162 preferably comprises at least 256 entries. Each entry 164 may have at least two fields—a field 166 and an associated field 168. Field 168 may comprise a single bit that indicates whether the instruction 170 is to be directly executed, or whether the associated field 166 contains a reference to a micro-sequence. For example, an asserted bit 168 may indicate the corresponding opcode is directly executable by the JSM, and a non-asserted bit 168 may indicate that the associated field 166 contains a reference to a micro-sequence.

If the bit 168 indicates the associated field 166 includes a reference to a micro-sequence, the reference may comprise the full starting address in instruction storage 130 of the micro-sequence, or a part of the starting address that can be concatenated with a base address that may be programmable in the JSM. In the former case, field 166 may provide as many address bits as are required to access the full memory space. In the latter case, a register within the JSM registers 140, or preferably within a JSM configuration register accessible through an indirect addressing mechanism using the IRI register, is programmed to hold the base address. In these embodiments the vector table 162 may supply only the offset to access the start of the micro-sequence. Most or all JSM internal registers 140 and the vector table 162 are accessible by the MPU 104, and therefore the entries 164 of the vector table 162 may be modified by the JVM as necessary. Although not required, the offset addressing technique may be preferred to reduce the number of bits needed within field 166. At least a portion 180 of the instruction storage 130 may be allocated for storage of micro-sequences and thus the starting address may point to a location in micro-sequence storage 180 at which a particular micro-sequence can be found. The portion 180 may be implemented in I-RAM 132 (FIG. 2) accessible by the MPU 104, which thus allows the micro-sequences to be changed.

In operation, the decode logic 152 uses an opcode, including the 0xC4 opcode when the WIDE ENABLE flag 198 is not asserted, as an index into micro-sequence vector table 162. Once the decode logic 152 locates the indexed entry 164, the decode logic 152 examines the associated bit 168 to determine whether the opcode triggers a micro-sequence. If the bit 168 indicates that the opcode can be directly processed and executed by the JSM, then the instruction is so executed. If, however, the bit 168 indicates that the opcode triggers a micro-sequence, then the decode logic 152 preferably changes the opcode into a "NOP," executes the NOP opcode, asserts the micro-sequence-active bit in the status register R15 (not specifically shown), and begins fetching the first micro-sequence instruction. Changing the opcode into a NOP while fetching the first instruction of the micro-sequence permits the JSM to process multi-cycle instructions that are further advanced in the pipe without additional latency. The micro-sequence-active bit may be asserted at any suitable time, such as when the micro-sequence enters the JSM execution stage (not specifically shown).

The JSM 102 implements two program counters—the PC 186 (register R4) and the micro-PC 188 (register R12). In accordance with some embodiments, one of these two program counters is the active program counter used to fetch and decode instructions. The PC 186 stored in register R4 may be the active program counter when executing bytecodes. The micro-PC 188 stored in register R12 may be the active program counter when fetching and executing micro-sequences. Asserting the status register's micro-sequence-active bit causes the micro-PC 188 (register R12) to become the active program counter instead of the PC 186. Also, the contents of the field 166 associated with the micro-sequenced opcode is loaded into the micro-PC 188. At this point, the JSM 102 begins fetching and decoding the instructions of the micro-sequence. At or about the time the decode logic begins using the micro-PC 188 from register R12, the PC 186 preferably is incremented by a suitable value to point the program counter to the next instruction following the opcode that triggered the micro-sequence. In at least some embodiments, the micro-sequence-active bit within the status register R15 may only be changed when the first instruction of the micro-sequence enters the execute phase of JSM 102 pipe. The switch from PC 186 to the micro-PC 188 preferably is effective immediately after the micro-sequenced instruction is decoded, thereby reducing the latency.

The micro-sequence, including the micro-sequence pointed to based on the 0xC4 opcode, may perform any suitable task, such as emulating an instruction from an instruction set not directly executable by the JSM 102, and then end with a predetermined instruction from the C-ISA called "RtuS" (return from micro-sequence) that indicates the end of the sequence. This C-ISA instruction causes a switch from the micro-PC (register R12) to the PC (register R4). Preferably, the PC 186 was previously incremented so that the value of the PC 186 points to the next instruction to be decoded.

Thus, the JSM 102 directly executes Java™ bytecodes to accelerate Java™ program execution. Where execution can be made more efficient using stack-based operations, the JSM 102 may replace direct execution of the Java™ bytecode with a series of one or more register-based C-ISA instructions. Thus, the JSM 102 directly implements two instruction sets: Java™ bytecodes; and register-based C-ISA instructions. In accordance with embodiments of the invention, the JSM 102 also emulates a third instruction set.

In particular, and in accordance with embodiments of the invention, the JSM 102 emulates direct execution of the other instruction sets, such as other CPU-independent instructions sets. One illustrative CPU-independent instruction set is in the ".NET" (pronounced "dot net") framework developed by Microsoft Corporation, of Redmond Wash. The .NET framework is a platform for creation of web-based services and applications. Programs generated under the illustrative .NET framework compile to a CPU-independent instruction set called the Microsoft Intermediate Language (MSIL). Programs compiled to MSIL that a user wishes to execute are provided to another program called an execution engine termed the common language runtime (CLR). In accordance with embodiments of the invention, the JSM 102 emulates direct execution of other instruction sets, such as MSIL, which limits or eliminates the need for an execution engine. Further in accordance with embodiments of the invention, the instruction set which the JSM 102 emulates may be of an arbitrary number of bits. The feature of emulating an instruction set of an arbitrary number of bits takes the further discussion along two paths: a first path for emulated instruction sets having fewer or the same number of bits as Java™ bytecodes; and a second path for emulated instruction sets having more bits than Java™ bytecodes.

Figure 5A:
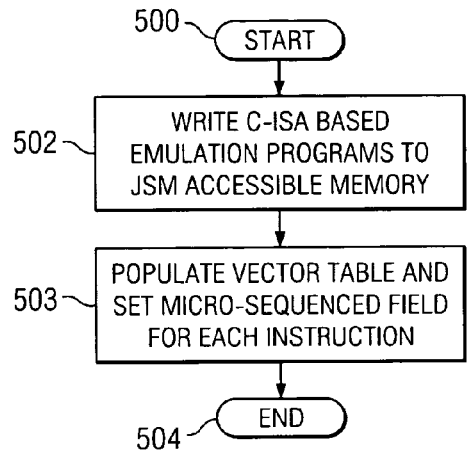
FIG. 5 (comprising FIGS. 5A and 5B) illustrates a method in accordance with embodiments of the invention.

FIG. 5A illustrates a flow diagram of a method to prepare the JSM 102 for emulation of the instruction set having the same or fewer bits than that of Java™ bytecodes. The process starts (block 500) and thereafter a set of C-ISA-based emulation programs are written to a memory accessible to the JSM (block 502), such as writing micro-sequence storage 180 by MPU 104. In the illustrative case of FIG. 5, each of the C-ISA-based emulation programs are register-based programs designed to emulate an instruction of an instruction set not directly executable by the JSM 102, such as NET MSIL. Thereafter, the vector table 162 (FIG. 4) is populated with pointers to each emulation program, and the micro-sequenced field 168 (FIG. 4) for each entry is asserted (block 503), and the preparation processor ends (block 504). In some embodiments, the MPU 104 populates the vector table 162 and asserts the micro-sequenced field 168 for each entry. At this point, the JSM 102 is ready to emulate execution of an instruction set that is not directly executable by the JSM 102.

Figure 5B:
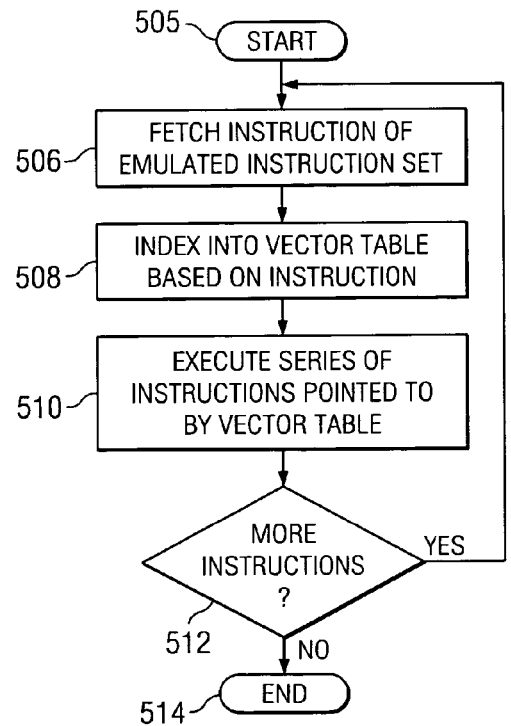

FIG. 5B illustrates a flow diagram of a method to emulate the instruction set once the preparations of FIG. 5A are complete. After preparing the JSM 102 for emulation of the instruction set (FIG. 5A), the illustrative process starts (block 505) and an instruction from the emulated instruction set is fetched (block 506), possibly by the instruction fetch logic 154 (FIG. 2). Thereafter, the decode logic 152 uses the fetched instruction as an index into the vector table 162 (block 508). Because each instruction of the vector table has its micro-sequenced field 168 asserted, the decode logic 152 triggers fetching and begins execution (block 510) of the C-ISA programs pointed to by the vector table, and in this case each C-ISA program emulates at least one instruction of the instruction set not directly executable by the JSM 102. Thereafter, a determination is made as to whether there are further instructions to emulate (block 512). If so, the illustrate method fetches the next instruction (block 506), otherwise the illustrative method ends (block 512).

For purposes of illustration, assume that one instruction of an instruction set to be emulated has a value 0xC4, the same as the Java™ WIDE opcode. Assuming the WIDE ENABLE flag 198 is not asserted, the decode logic 152 treats the 0xC4 value as an executable code, and use the value as an index into the vector table to determine if the value triggers a micro-sequence. Because of previous preparation for emulating direct execution of an instruction set, the vector table entry at index 0xC4 points to a C-ISA instruction that is executed by the JSM 102 to emulate the instruction having a 0xC4 value. The 0xC4 value is merely illustrative, and indexing into the vector table and triggering C-ISA programs occurs for all values of the emulated instruction set. Thus, the non-supported instruction set is executed without the need for, or at least a reduced need for, an execution engine to translate to machine language.

As mentioned, the emulated instruction set need not have the same number of bits as Java bytecodes. This gives rise to several alternatives for operation. For example, the emulated instruction set could be aligned on a byte boundary, leaving unused bits in the most or least significant positions. Another implementation is to have the bits of the emulated instruction set in the middle of the available instruction set size, leaving the pad bits on either end. If the pad bits are allowed to take arbitrary values, multiple full addresses (emulated bits plus pad bits) may point to the same micro-sequences. In some embodiments, the various pad bits are set to zero. Further still, the pad bits could themselves be the operands for the emulated instruction, negating the need for the micro-sequences to fetch operands.

The illustrative method of FIG. 5 assumes that the instruction set to be emulated has the same or fewer bits than the Java™ bytecodes set directly executable by the JSM 102. In this circumstance, the decode logic 152, using the vector table 162, can find precisely the C-ISA program that performs the emulation. However, further embodiments of the invention are not limited to emulation of instruction sets having the same or fewer bits than Java™ bytecodes. In the further embodiments, the instruction to be emulated may have any number of bits greater than that of a Java™ opcode.

Figure 6A:
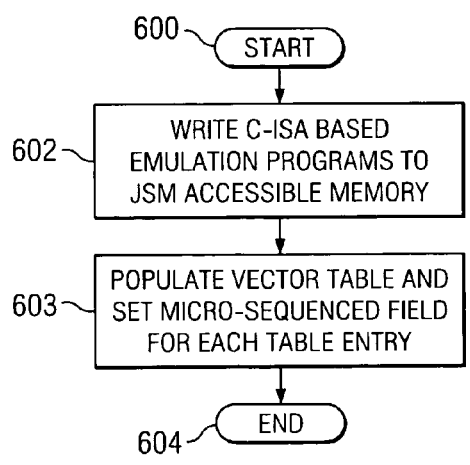
FIG. 6 (comprising FIGS. 6A and 6B) illustrates a method in accordance with further embodiments of the invention.

FIG. 6A illustrates a flow diagram of a method to prepare the JSM 102 for emulation of the instruction set having more bits than that of Java™ bytecodes. In particular, the process starts (block 600) and thereafter a set of C-ISA-based emulation programs are written to a memory accessible to the JSM (block 602). In the illustrative case of FIG. 6A, each of the C-ISA-based emulation programs are register-based programs designed, at least in part, to emulate instruction of an instruction set not directly executable by the JSM 102, such as .NET MSIL. Thereafter, the vector table 162 (FIG. 4) is populated with pointers to each emulation program, and the micro-sequenced field 168 (FIG. 4) for each entry is asserted (block 603), and the illustrative method ends. At this point, the JSM 102 is ready to emulate execution of an instruction set that is not directly executable by the JSM 102.

Figure 6B:
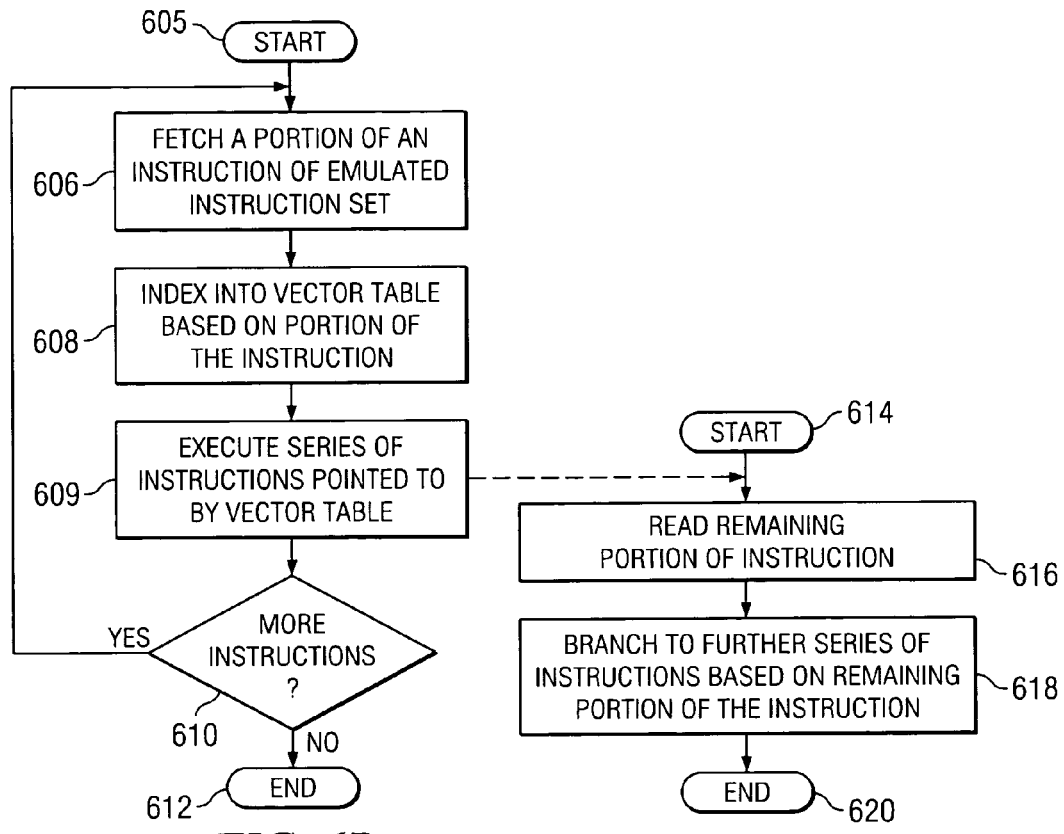

Referring to FIG. 6B, after preparing the JSM 102 for emulation of the instruction set (FIG. 6A), the illustrative process starts (block 605), and at least a portion of an instruction from the emulated instruction set is fetched (block 606), possibly by the instruction fetch logic 154 (FIG. 2). Keeping in mind that each instruction of the illustrative instruction set to be emulated has more bits than Java™ bytecodes, in some cases the first N bits of the instruction are fetched. In other cases the last N bits of the instruction are fetched. In illustrative cases where the JSM 102 directly executes Java™ bytecodes, N may be equal to eight. Thereafter, the decode logic 152 uses the portion of the fetched instruction as an index into the vector table 162 (block 608). Because each instruction of the vector table has its micro-sequenced field 168 asserted, the decode logic 152 triggers fetching and begins execution (block 609) of a C-ISA program pointed to by the vector table. Thereafter, a determination is made as to whether there are more instructions to execute (block 610). If so, further instruction portions are fetched (block 606). If not, the illustrative method ends (block 612).

Because the portion of the instruction fetched does not fully identify the instruction of the instruction set, executing the series of instructions pointed by the vector table triggers further action on the part of the C-ISA program to identify the instruction. Still referring to FIG. 6, the decode logic 152 starts (block 614) a C-ISA program, and thereafter the program reads the remaining portion of the instruction to be emulated (block 616). In the case where the decode logic 152 indexes into the vector table 162 based on the first N bits, the C-ISA program reads the remaining M-N bits (where M is the number of bits of each instruction of the instruction set to be emulated). In the case where the decode logic 152 indexes into the vector table 162 based on the last N bits, the C-ISA program reads the first M-N bits of the instruction. Based on the remaining bits read, the C-ISA program branches to further portions of the series of instructions (block 618) that emulate the desired instruction. Thereafter, the C-ISA portion of the process ends (block 620). Thus, the non-supported instruction set is executed without the need for, or at least a reduced need for, an execution engine and in spite of the fact that each instruction of the non-supported instruction set has more bits than a primary instruction set of the JSM 102, such as Java™.

Figure 7:
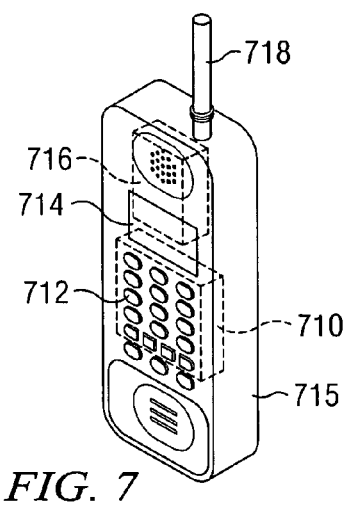
FIG. 7 depicts an illustrative embodiment of the system described herein.

System 100 may be implemented as a mobile cell phone such as that shown in FIG. 7. As shown, the mobile communication device includes an integrated keypad 712 and display 714. The JSM processor 102 and MPU processor 104 and other components may be included in electronics package 710 connected to the keypad 712, display 714, and radio frequency ("RF") circuitry 716. The RF circuitry 716 may be connected to an antenna 718.

While the various embodiments of the invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. For example, any instruction set of any size may be emulated by the JSM 102, not just NET CLR. Each and every claim is incorporated into the specification as an embodiment of the present invention.

What is claimed is:

1. A method comprising:
    fetching at least a first portion of an instruction, the instruction from a first instruction set that is not directly executable by a processor;
    indexing into a table to an index location, the index location based on the at least a portion of the instruction;
    executing a first series of instructions, the first series of instructions from a second instruction set directly executable by the processor, the first series of instructions pointed to by the table at the index location, wherein executing the first series of instructions further comprises fetching a second portion of the instruction, and triggering execution of a second series of instructions; and thereby
    emulating execution of the instruction from the first instruction set.

2. The method as defined in claim 1 further comprising:
    wherein fetching further comprises fetching M bits of the instruction having N bits, where N is greater than M;
    wherein executing further comprises executing the first and second series of instructions, each of the first and second series of instructions from an instruction set of M bits or less.

3. A processor comprising:
    an instruction fetch logic;
    a decode logic coupled to the instruction fetch logic;
    wherein the processor fetches, decodes and directly executes instructions from a first instruction set comprising M number of bits and a second instruction set; and
    wherein the processor emulates executing instructions from a third instruction set using the first instruction set, each instruction of the third instruction set comprising N number of bits with N less than or equal to M.

4. The processor as defined in claim 3 further comprising:
    a vector table associated with the decode logic;
    wherein the processor, when emulating execution of instructions from the third instruction set, uses instructions from the third instruction set as a reference to a portion of the vector table, which vector table is configured to contain a pointer to one or more instructions directly executable by the processor to emulate execution of each instruction.

5. The processor as defined in claim 3 wherein the first instruction set is a register-based instruction set, the second instruction set is a stack-based instruction set, and M equals eight (8).

6. The processor as defined in claim 5 wherein the second instruction set is Java bytecodes.

7. The processor as defined in claim 3 wherein each instruction in the first instruction set comprise M number of bits, and wherein each instruction of the third instruction set comprises N number of bits with N greater than M.

8. The processor as defined in claim 7 further comprising:
    a vector table associated with the decode logic;
    wherein the processor, emulating execution of instructions from the third instruction set, uses a first portion of an instruction from the third instruction set as a reference to a portion of the vector table, which vector table is configured to contain a pointer to a first series of instructions directly executable by the processor; and
    wherein the first series of instructions directly executable by the processor are configured to obtain a second portion of the instruction of the third instruction set, and wherein the series of instructions are further configured to trigger execution of a second series of instructions directly executable by the processor to emulate execution of the instruction of the third instruction set.

9. The processor as defined in claim 7 wherein the first instruction set is a register-based instruction set, the second instruction set is a stack-based instruction set, and M equals eight (8).

10. The processor as defined in claim 9 wherein the second instruction set is Java bytecodes.

11. A device comprising:
a first processor;
a memory coupled to the first processor;
a second processor coupled to the first processor and the memory;
wherein the second processor fetches, decodes, and directly executes instructions from a first instruction set, and fetches, decodes, and directly executes instructions from a second instruction set; and
wherein the second processor emulates executing instructions from a third instruction set using the first instruction set.

12. The device as defined in claim 11 wherein each instruction in the first instruction set comprises M number of bits, and wherein the each instruction of the third instruction set comprises N number of bits with N less than or equal to M.

13. The device as defined in claim 12 further comprising:
a vector table associated with the second processor;
wherein the second processor, when emulating execution of instructions from the third instruction set, uses instructions from the third instruction set as a reference to a portion of the vector table, which vector table is configured to contain a pointer to one or more instructions directly executable by the second processor to emulate execution of each instruction.

14. The device as defined in claim 12 wherein the first instruction set is a register-based instruction set, the second instruction set is a stack-based instruction set, and M equals eight (8).

15. The device as defined in claim 14 wherein the second instruction set is Java byte codes.

16. The device as defined in claim 11 wherein each instruction in the first instruction set comprise M number of bits, and wherein the each instruction of the third instruction set comprises N number of bits with N greater than M.

17. The device as defined in claim 16 further comprising:
a vector table associated with the second processor;
wherein the second processor, emulating execution of instructions from the third instruction set, uses a first portion of an instruction from the third instruction set as a reference to a portion of the vector table, which vector table is configured to contain a pointer to a first series of instructions directly executable by the second processor; and
wherein the first series of instructions directly executable by the second processor are configured to obtain a second portion of the instruction of the third instruction set, and wherein the series of instructions are further configured to trigger execution of a second series of instructions directly executable by the second processor to emulate execution of the instruction of the third instruction set.

18. The device as defined in claim 16 wherein the first instruction set is a register-based instruction set, the second instruction set is a stack-based instruction set, and M equals eight (8).

* * * * *